(12) United States Patent
Rosenberg et al.

(10) Patent No.: US 12,491,304 B2
(45) Date of Patent: Dec. 9, 2025

(54) TREATING CIRCULATING CELL CLUSTERS

(71) Applicant: OncoClear, Inc., Boca Raton, FL (US)

(72) Inventors: Mark A. Rosenberg, Boca Raton, FL (US); James W. Hill, Las Vegas, NV (US)

(73) Assignee: OncoClear, Inc., Los Angeles, CA (US)

( * ) Notice: Subject to any disclaimer, the term of this patent is extended or adjusted under 35 U.S.C. 154(b) by 0 days.

(21) Appl. No.: 18/797,358

(22) Filed: Aug. 7, 2024

(65) Prior Publication Data

US 2025/0050005 A1    Feb. 13, 2025

Related U.S. Application Data

(60) Provisional application No. 63/531,255, filed on Aug. 7, 2023.

(51) Int. Cl.
*A61M 1/36*     (2006.01)
*A61M 1/34*     (2006.01)

(52) U.S. Cl.
CPC .... *A61M 1/362264* (2022.05); *A61M 1/3401* (2022.05); *A61M 1/3406* (2014.02); *A61M 1/36224* (2022.05); *A61M 2202/0021* (2013.01); *A61M 2202/0028* (2013.01); *A61M 2202/0042* (2013.01); *A61M 2202/005* (2013.01); *A61M 2202/0427* (2013.01); *A61M 2202/0443* (2013.01); *A61M 2202/097* (2013.01); *A61M 2205/0216* (2013.01); *A61M 2205/0233* (2013.01); *A61M 2205/0255* (2013.01); *A61M 2205/10* (2013.01); *A61M 2205/126* (2013.01); *A61M 2205/3327* (2013.01); *A61M 2205/3334* (2013.01); *A61M 2205/7527* (2013.01); *A61M 2205/7545* (2013.01)

(58) Field of Classification Search
None
See application file for complete search history.

(56) References Cited

U.S. PATENT DOCUMENTS

| | | | |
|---|---|---|---|
| 9,545,471 B2 | 1/2017 | van Rijn et al. | |
| 11,607,480 B2 | 3/2023 | Keaney et al. | |
| 11,724,015 B2 | 8/2023 | Surkov | |
| 2015/0041398 A1* | 2/2015 | van Rijn | A61M 1/3482 210/663 |
| 2020/0264166 A1* | 8/2020 | Paterlini-Brechot | G01N 33/57492 |

OTHER PUBLICATIONS

Schuster et al, "Better together: circulating tumor cell clustering in metastatic cancer," Trends in Cancer, Nov. 2021, vol. 7, No. 11. (Year: 2021).*
PCT International Search Report and Written Opinion, PCT Application No. PCT/US2024/41336, Oct. 18, 2024, 14 pages.
Tamminga, M. et al., "Detection of Circulating Tumor Cells in the Diagnostic Leukapheresis Product of Non-Small-Cell Lung Cancer Patients Comparing CellSearch® and ISET," Cancers, vol. 12, Apr. 7, 2020, pp. 1-15.

* cited by examiner

*Primary Examiner* — Krishnan S Menon
(74) *Attorney, Agent, or Firm* — FENWICK & WEST LLP

(57) ABSTRACT

Circulating cell clusters found in subjects with cancer, autoimmune conditions, infections, or other diseases, can be trapped or disrupted by filtering them with an intra- or extracorporeal device and, in some cases, exposing them to a substance, such as enzyme, that reduces intercellular adhesion.

5 Claims, 4 Drawing Sheets

TREATING CIRCULATING CELL CLUSTERS

1. CROSS-REFERENCE TO RELATED APPLICATIONS

This application claims the benefit of U.S. Provisional Application No. 63/531,255, filed Aug. 7, 2023, which is hereby incorporated in its entirety by reference.

2. BACKGROUND

Circulating tumor cells (CTC) can initiate metastasis in cancer. Sometimes CTCs form clusters. Other cell types are also found in circulating clusters associated with disease.

3. FIELD

The subject technology relates generally to oncology, infectious diseases, rheumatology, and other fields of medicine and physiology.

4. SUMMARY

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination and placed into a respective independent clause or into other of the independent clauses. Other clauses can be presented in a similar manner.

In one aspect, described here is a system for removing cancer-associated cell clusters from blood circulation of a subject, the system comprising:
 a filter module comprising:
  (a) an input port;
  (b) an output port; and
  (c) a membrane having pores configured to allow at least a portion of a subject's blood to pass through the pores from a first side to a second side of the membrane;
 wherein the input port is configured to allow the subject's blood to flow into a first chamber to contact the membrane;
 wherein the filter module is configured to retain circulating cancer-associated cell clusters on the first side of the membrane, each cluster comprising three or more cells; and
 wherein the filter module is configured to allow individual circulating cancer cells in the subject's blood to pass through the pores to the second side of the membrane and into a second chamber and return to the subject's blood circulation via the output port.

In some embodiments, the pores have an average size of at least 20 microns.

In some embodiments, the pores have an average size of at least 25 microns.

In some embodiments, the pores have an average size of at least 30 microns.

In some embodiments, the pores have an average size of at least 40 microns.

In some embodiments, the pores have an average size of at least 50 microns.

In some embodiments, the pores have an average size of at least 60 microns.

In some embodiments, the pores have an average size of between 20 microns to 60 microns. In some embodiments, the pores have an average size of between 25 microns to 35 microns, between 30 microns to 40 microns, or between 15 microns to 30 microns.

In accordance with any of the embodiments, the filter module comprises metal, stainless steel, plastic polymer, polyester, nylon, PVC, PTFE, polypropylene, polyethersulfone, or any combination thereof.

In accordance with any of the embodiments, the circulating cancer-associated cell clusters comprise circulating tumor cells, endothelial cells, tumor-associated macrophages, neutrophils, T cells, B cells, dendritic cells, platelets, fibroblasts, or any combination thereof.

In accordance with any of the embodiments, the filter module is configured to allow a flux of blood passing through the filter at a rate between 0.2 and 100 ml/cm$^2$/sec.

In some embodiments, the system comprises an extracorporeal circuit comprising the filter module for extracorporeal removal of the cancer-associated cell clusters.

In some embodiments, the system comprises an intracorporeal circuit comprising the filter module for intracorporeal removal of the cancer-associated cell clusters.

In some embodiments, the system reduces the blood level of circulating cancer-associated clusters by at least 25%, at least 50%, at least 75%, or at least 95% per single procedure.

In one aspect, described herein are uses of the system of in accordance with any of the embodiments for removing cancer-associated cell clusters from blood circulation of a subject.

In one aspect, described herein are uses of the system in accordance with any of the embodiments for reducing metastasis of a cancer and/or improving progression-free survival of a subject by removing cancer-associated cell clusters from blood circulation of the subject.

In one aspect, described herein is a method of removing circulating cancer-associated cell clusters from a subject, the method comprising:
 connecting a portion of the subject's blood stream to a system in accordance with any embodiments; and returning blood from the second chamber to the subject's blood circulation via the output port.

In some embodiments, the method further comprising allowing individual cancer cells to flow through the membrane pores having an average size of at least 20 microns.

In some embodiments, the circulating cancer-associated cell clusters comprises circulating tumor cells, endothelial cells, macrophage or tumor-associated macrophages, neutrophil, T cells, B cells, dendritic cells, platelets, fibroblasts, or combinations thereof.

In some embodiments, the method comprising adjusting the flux of blood passing through the filter at a rate between 0.2 and 100 ml/cm$^2$/sec.

In some embodiments, the subject is a mammal.

In some embodiments, the subject is a human.

In accordance with any of the embodiments, the method further comprising performing the method once or twice a week.

In some embodiments, the method reduces the blood level of circulating cancer-associated clusters by at least 25%, at least 50%, at least 75%, or at least 95% per single procedure.

In some embodiments, the subject has a disease characterized by elevated level of circulating cancer-associated cell clusters in the blood.

In some embodiments, the subject has a cancer selected from skin cancer, breast cancer, lung cancer, colon cancer, prostate cancer, pancreatic cancer, ovarian cancer, bone cancer, soft tissue cancer, acute myeloid leukemia, chronic myeloid leukemia, acute lymphoblastic leukemia, chronic lymphocytic leukemia, Hodgkin lymphoma, non-Hodgkin lymphoma, brain cancer, or combinations thereof.

In some embodiments, the cancer is a primary cancer or a metastatic cancer.

In some embodiments, the method reduces metastasis of the cancer.

In some embodiments, the method improves the subject's progression-free survival by at least 1, 2, 3, 4, 5, 6, 7, 8, 9, 10, 11, 12, 24, 36, 48, 60, or 72 months.

In one aspect, described herein is a method of removing circulating cancer-associated cell clusters from a subject, comprising:
 introducing a portion of a subject's blood circulation into a filter comprising a membrane having pores that permit at least some of the subject's blood to pass through the pores from a first side to a second side of the membrane;
 wherein the pores are sized and configured to permit individual cancer cells to pass freely through the pores from the first side to the second side of the membrane;
 wherein the pores are further sized and configured to prevent circulating cell clusters from passing through the pores, each of the circulating cell clusters comprising three or more cells; and
 returning blood from the second side of the membrane to the subject's blood circulation.

5. BRIEF DESCRIPTION OF THE SEVERAL VIEWS OF THE DRAWINGS

These and other features, aspects, and advantages of the present invention will become better understood with regard to the following description, and accompanying drawings, where:

6. DETAILED DESCRIPTION

Figure 1A:
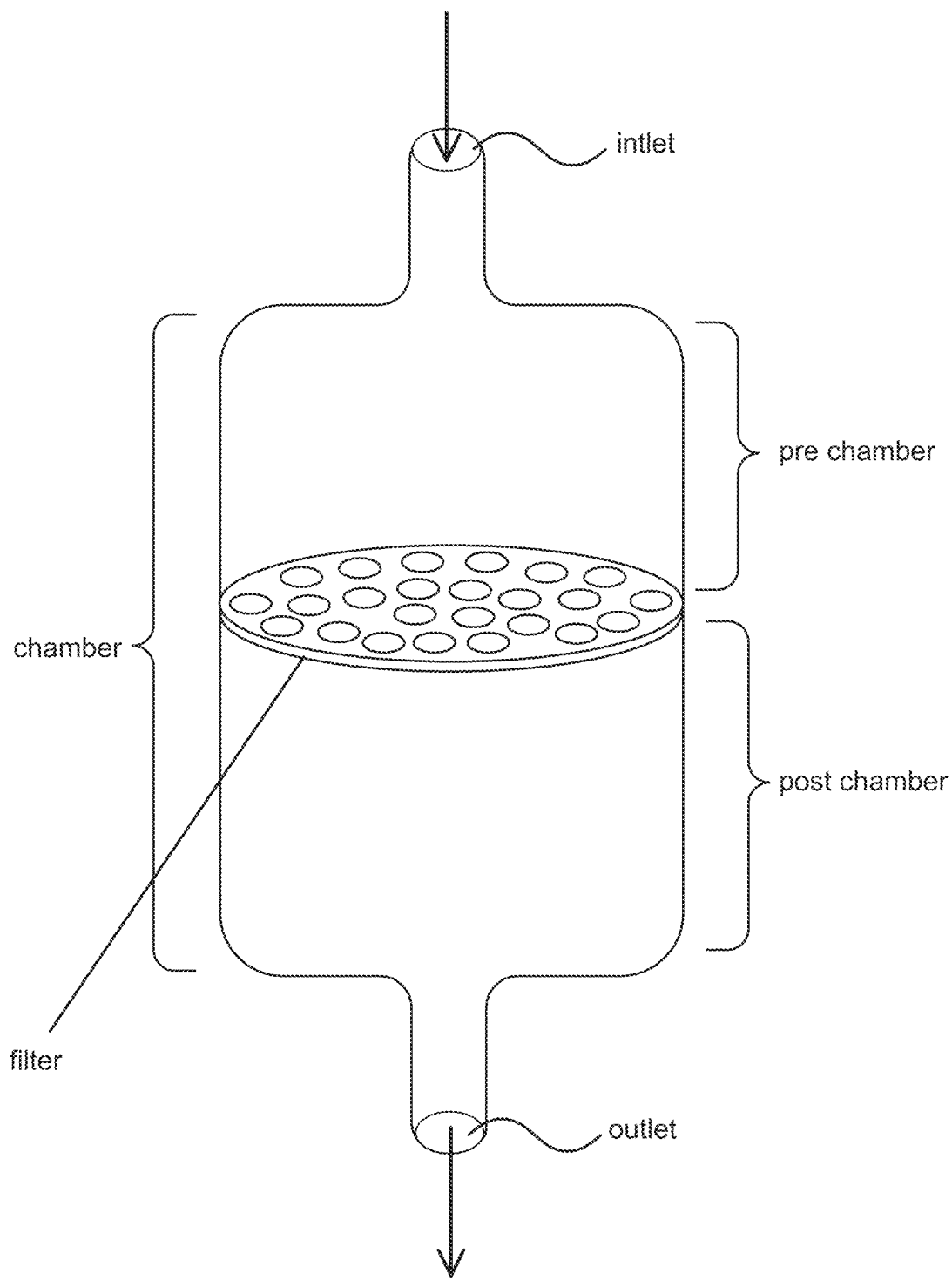
FIGS. 1A and 1B show schematic embodiments of a cell cluster chamber including a filter.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

6.1. Definitions

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

Singular forms "a", "an", and "the" include plural references unless the context clearly dictates otherwise. Thus, for example, a reference to "a method" includes one or more methods, and/or steps of the type described herein and/or which will become apparent to those persons skilled in the art upon reading this disclosure.

The term "about" or "approximately" includes being within a statistically meaningful range of a value. Such a range can be within an order of magnitude, preferably within 50%, more preferably within 20%, still more preferably within 10%, and even more preferably within 5% of a given value or range. The allowable variation encompassed by the term "about" or "approximately" depends on the particular system under study, and can be readily appreciated by one of ordinary skill in the art.

The term "device" as used herein refers to any assembly known in the field to enable the purification of liquid solutions, such as, without limitation, e.g., any hollow-ware, a column, a column matrix, a filter, a membrane, a semipermeable material, a bead (e.g., a microbead or a nanobead), or a tubing.

As used herein, the terms "cancer-associated cell clusters", "circulating cancer-associated cell clusters", "tumor cell cluster", and "circulating tumor cell clusters" are used interchangeably to refer to clusters of cells comprising circulating tumor endothelial cells or clusters, cancer-associated macrophage-like cells or clusters, cancer-associated fibroblasts or clusters, neutrophils or clusters or circulating tumor cell-neutrophil clusters, circulating stromal cells or clusters, circulating macrophage-lymphocyte cells or clusters, circulating tumor cell-platelet clusters, macrophage clusters, homotypic circulating tumor cells or clusters, heterotypic circulating tumor cells or clusters, and/or nucleosome-bound cell free DNA (cfDNA), in a subject's blood stream. A cell cluster is a complex of cells of different origins and typically comprising at least 3, 4, 5, 6, 7, 8, 9, or 10 cells. In some embodiments, a cell cluster comprises at least 3 cells and fragments of circulating DNA, cell free DNA, nucleosome-bound cell free DNA. For example, a cell cluster may comprise a cancer-associated cell or fragments thereof and shredded endothelial cells.

As used herein, the terms "cancer associated cells", "cancer-associated cells", and "circulating tumor cells" are used interchangeably to refer to circulating cancer or tumor cells that are not part of a cell cluster or complex. In some embodiments, a cancer-associated cell is an individual cell that has a size of about 7-20 microns.

As used herein, the terms "circulating DNA", "cell free DNA (cfDNA)", "circulating cfDNA", "extracellular DNA (eDNA)", and "circulating eDNA" are used interchangeably to refer to DNA present in blood or plasma located outside of circulating cells of hematopoietic and non-hematopoietic origin.

Nucleosome-bound cfDNA is DNA that is bound to a nucleosome. A nucleosome is a subunit of nuclear chromatin. Nucleosome-bound cfDNA might circulate in blood as mononucleosomes or higher order structures such as oligonucleosomes or even fragments of chromatin containing over $50\text{-}100 \times 10^3$ base pairs of DNA. Circulating nucleosome-bound cfDNA may originate from cells undergoing necrosis or apoptosis and from neutrophil NETosis.

As used herein, the terms "subject" and "patient" are used interchangeably and refer to animals, including mammals such as humans, veterinary animals (e.g., cats, dogs, cows, horses, sheep, pigs, etc.), and experimental animal models. In certain embodiments, the subject refers to a human patient, including both genders in adult and child populations.

As used herein, "a period of at least" a particular time (e.g., "a period of at least one day") refers to time period having of a duration of at least as long as that time (e.g., a period lasting one day or more in duration).

Any of the methods or systems of administering a substance to disrupt intracellular adhesions as described herein may be used, as will be evident to one skilled in the art, for any of the conditions listed in this description of the subject technology. The amounts and timing of exposure to the genetic vector carrier and of drug administration may be altered or titrated according to patient response.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" can include, but does not require, selection of at least one of each item in the series. Rather, the phrase allows a meaning that includes at least one of any one of the items, and/or at least one of any combination of the items, and/or at least one of each of the items. By way of example, the phrase "at least one of A, B, and C" includes at least one of only A, of only B, of only C, of any combination of A, B, and C; and/or of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner like the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined, bolded, and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

6.2. Circulating Tumor Cells

Cancer metastases arise from circulating tumor cells (CTCs) shed from a primary tumor to circulate through lymphatic and blood vessels. Elevated levels of CTCs isolated from a blood draw are prognostic in patients with metastatic breast, colorectal, prostate, lung, and prostate cancers.

Furthermore, CTC analysis holds promise for predicting benefit from targeted therapies, pharmacodynamic monitoring during treatment, and insight into the biology of metastases. Indeed, CTC evaluation might be used for early detection of malignancy, if an assay with sufficient sensitivity and specificity could be developed.

The biology underlying clustering of CTCs has been investigated with specialized microfluidic tools that enable isolation of clustered CTCs alongside with single CTCs, and with single cell-resolution assays and next-generation sequencing methods. Such studies highlight important biological insights featuring clusters of cancer cells only (i.e., homotypic CTC clusters) as well as clusters that comprise non-cancerous cells additionally to cancer cells (heterotypic CTC clusters), suggesting a prominent role for these multicellular aggregates in the metastatic process.

One example of an antigen-dependent CTC isolation technology is CellSearch, based on antibody-mediated CTC recognition through Epithelial cell Adhesion Molecule (EpCAM) and cytokeratin staining (both are expressed by epithelial cells but absent in blood cells), concomitantly with CD45 staining to exclude white blood cells (WBCs). CellSearch has been widely used for CTC enumeration in several studies involving large patient populations and received FDA approval for the identification of high-risk patients among those with metastatic breast, prostate and colorectal cancer. Alternatively, examples for antigen-independent CTC technologies include size-based approaches, for instance based on narrowing microfluidic channels that allow the passage of blood cells, while due to their larger diameter CTCs are trapped, independently of marker expression.

6.3. Circulating Tumor Endothelial Cell Clusters

In addition to CTC clusters, there are other clusters instrumental in the metastatic process. It has been demonstrated that circulating tumor endothelial cell clusters are required for tumor vasculature, aid in priming metastatic niches, and contribute to the molecular instability of tumors.

6.4. Cancer-Associated Macrophage-Like Cells

Another type of cell instrumental in the metastatic process is the cancer-associated macrophage-like cell (CAML). CAMLs are a cancer-specific circulating stromal cell common in a variety of solid cancers regardless of disease stage. Though overall CAML average appears not to be predictive for survival outcomes, the presence of any large CAML is a significant prognosticator for worse outcome. Again, these cells are significantly larger than other circulating cell types.

6.5. Cancer-Associated Fibroblasts

Cancer-associated fibroblasts (CAFs) present in clusters can further enhance the survival of CTCs in circulation. CAFs can help cancer cells to survive in circulation by conferring resistance to the fluid shear forces, the main cause of CTC death in the circulation. CAFs may help CTCs to survive in circulation by priming cancer cells at the primary site and within heterotypic CTC clusters. Furthermore, they may contribute to create a suitable environment for CTCs to survive and proliferate at distant sites, probably protected from immune attack due to CAFs-mediated immune evasion. A significant association exists between the presence of CAFs in the circulation of breast cancer patients and the presence of metastatic disease, with these cells predominantly found clustering with CTCs.

6.6. Neutrophil Clusters

The neutrophil-to-lymphocyte ratio (NLR), calculated as a simple ratio between the neutrophil and lymphocyte counts measured in peripheral blood, is a biomarker which reflects the balance between two aspects of the immune system: acute and chronic inflammation (as indicated by the neutrophil count) and adaptive immunity (lymphocyte count). NLR is associated with outcome and predicts disease course among patients with a variety of medical conditions including ischemic stroke, cerebral hemorrhage, major cardiac events, and sepsis and infectious diseases. Furthermore, in cancer patients, higher NLR has been associated with poor prognosis. These adverse associations may reflect the contributions of severe inflammation and poor immune function to the progression of these diseases.

Breaking up circulating neutrophil clusters has been hypothesized to permit the bone marrow to sense a larger functional neutrophil population in circulation than before the cluster breakup, and to cause the bone marrow to decrease the circulating neutrophil population, e.g., by reduction of granulocyte colony stimulating factor (GCSF) production and release, and thereby reduce adverse inflammatory effects.

6.7. Stromal Cell Clusters

Evidence supports the hypothesis that multicellular tumor clusters invade and seed metastasis. Tumor-associated stroma induces epithelial-mesenchymal plasticity in tumor cell clusters to promote invasion and metastasis. Carcinoma-associated fibroblasts (CAFs) frequently present in tumor stroma drive the formation of tumor cell clusters composed of two distinct cancer cell populations, one in a highly epithelial (E-cadherin$^{hi}$ZEB1$^{lo/neg}$: E$^{hi}$) state and another in a hybrid epithelial/mesenchymal (E-cadherin$^{lo}$ ZEB1$^{hi}$: E/M) state. The E$^{hi}$ cells highly express oncogenic cell-cell adhesion molecules, such as carcinoembryonic antigen-related cell adhesion molecule 5 (CEACAM5) and CEACAM6 that associate with E-cadherin, resulting in increased tumor cell cluster formation and metastatic seeding. The E/M cells also retain associations with E$^{hi}$ cells, which follow the E/M cells leading to collective invasion. CAF-produced stromal cell-derived factor 1 and transforming growth factor-β confer the E$^{hi}$ and E/M states as well as invasive and metastatic traits via Src activation in apposed human breast tumor cells. Taken together, these findings indicate that invasive and metastatic tumor cell clusters are induced by CAFs via epithelial-mesenchymal plasticity.

6.8. Macrophage-Lymphocyte Clusters

Macrophage-lymphocyte clusters form when, for example, lymph node cells and autologous peritoneal exudate cells from guinea pigs immunized with tubercle bacilli are cultured in the presence of purified protein derivative of tuberculin (PPD) for 20 h. The simplest macrophage-lymphocyte cluster consists of one macrophage, one large central lymphocyte with a blastoid appearance attached to the macrophage with a broad area of contact, and from a few to more than 20 small peripheral lymphocytes attached to the central lymphocyte by their uropods. Some clusters are of more complex type, containing two or three macrophages or one macrophage with more than one central lymphocyte attached to the surface, but even in these clusters each peripheral lymphocyte was attached only to one central lymphocyte. By morphological criteria the peripheral lymphocytes are T lymphocytes.

6.9. Circulating Tumor Cell-Platelet Clusters

Circulating tumor cell (CTC) clusters are often found to be associated with platelets. It is not clear if platelets play any role in maintaining their integrity during the transit or their dissemination ability. Currently available anti-platelet agents (e.g., aspirin, clopidogrel) can assist in dissociating CTC clusters according to the subject technologies.

6.10. Macrophage Clusters

In adult patients with a slowly progressive demyelinating neuropathy, it may be difficult to distinguish between a hereditary neuropathy and chronic inflammatory demyelinating polyneuropathy (CIDP). In some embodiments, the presence of three or more macrophages around one blood vessel can defined as a cluster. The percentage of endoneurial vessels with macrophage clusters is higher in CIDP than in hereditary neuropathies. The presence of one perivascular macrophage cluster per fascicle can differentiate between inflammatory and other forms of neuropathy with a sensitivity of about 75% and specificity about 72%.

Breaking up circulating macrophage clusters is hypothesized to reduce adverse inflammatory effects in autoimmune diseases, such as CIDP, and other diseases including cancers.

6.11. Homotypic Circulating Tumor Cell Clusters

Generally, CTC clusters appear to be a feature of adenocarcinomas of the breast, colon, lung or stomach, and they have also been found in hepatocellular carcinoma, prostate cancer, choriocarcinoma and renal cell carcinoma, among other cancer types. Their presence in the bloodstream of cancer patients has been associated to a poor clinical outcome in a number of studies and cancer types.

Homotypic CTC clusters typically comprise a minority (1-30%) of the total CTC events found in the peripheral circulation of patients or mouse models, and their abundance is subject to disease stage, as well as size and molecular characteristics of the tumors. Despite their rarity in comparison to single CTCs, CTC clusters have been shown to be responsible for the formation of most metastatic lesions in animal models, and to carry a substantially elevated metastasis-initiating ability. The number of detectable CTC clusters increases during disease progression, and their frequency rises as well when drawing blood from upstream locations, e.g., from the tumor draining vessel as opposed to more peripheral sites, arguing that CTC clusters may be trapped in small capillary networks before reaching the periphery. Similarly, to single CTCs, the presence of CTC clusters is also an indicator of a poor prognosis in breast, colon and small-cell lung cancer, and CTC clusters appear to be a better independent survival predictor compared to CTCs alone.

Homotypic CTC clusters present important features that have been recently identified. The presence of functional cell-cell junctions between cells in a cluster is critical for their existence, and in this context, key players such as plakoglobin, claudin 3 and claudin 4 have been identified and functionally validated. CTC clusters have also been shown to express the epithelial cytoskeletal protein keratin 14 (K14), and to be dependent upon K14 expression for the achievement of metastatic dissemination. In a separate study, breast CTC clusters have also been reported to rely on CD44 homophylic interactions to maintain their multicellular structure. Generally, intercellular junctions in CTC clusters appear to have a more profound effect than just cell-cell junction: in a recent study, the ability of cancer cells to form clusters was shown to impact on DNA methylation dynamics, and lead to the hypomethylation of binding sites for stemness- and proliferation-related transcription factors such as OCT4, SOX2 NANOG and SIN3A, among others. Dissociation of CTC clusters into single cells, either via cell-cell junction disruption or pharmacological treatment, leads to re-methylation of these critical transcription factor binding sites and suppression of their metastasis-seeding ability.

6.12. Heterotypic Circulating Tumor Cell Clusters

Heterotypic CTC clusters are aggregates of cancer cells with non-malignant stromal or immune cells. These non-malignant cells comprise white blood cells, fibroblasts, endothelial cells and platelets and have been shown to contribute to the metastatic potential of CTCs in various ways. CTCs can be found within the bloodstream of patients and mouse models in association with immune cells, which in most cases belong to the myeloid lineage. When myeloid cells at various stages of differentiation (myeloid-derived suppressor cells to neutrophils) adhere to CTCs, their main effect is to increase CTCs' metastatic potential by promoting proliferation. In CTC-neutrophil clusters, this is mediated by a cytokine-receptor crosstalk involving IL-1$\beta$ and IL6, whose depletion is sufficient to abrogate neutrophil-induced proliferation in CTCs, resulting in a reduced metastatic ability. CTC-neutrophil clusters are kept together through VCAM-1-dependent intercellular junctions, and accordingly, CRISPR-based depletion of VCAM-1 in xenografts prevents CTC-neutrophil clusters formation. Interestingly, the first interaction between CTCs and neutrophils does not seem to occur within the bloodstream, but at the level of the primary tumor, where tumor-infiltrating neutrophils detach from the primary cancer site together with cancer cells and enter the bloodstream already in the form of CTC-neutrophil clusters. Neutrophil recruitment to the primary tumor is influenced by a variety of released factors and by genetic makeup of tumor cells themselves. Given this, heterotypic CTC clusters may comprise various cell types in different cancers, depending on what is the most abundant infiltrating immune or stromal cells in a given tumor.

Along these lines, in a context-dependent fashion, heterotypic CTC clusters have also been found to contain non-immune stromal cells. For instance, in lung cancer mouse models, CTCs have been found in association to fibroblasts, and this interaction also increased the metastatic ability of CTCs themselves. Fibroblast depletion resulted in a decreased tumor growth rate and reduced metastasis, indicating that the interaction between cancer cells and fibroblasts may support the metastatic spread of cancer. Further, other cell types have been found to promote the metastatic ability of cancer cells. These include cancer-endothelial cells co-culture models used for subsequent transplantation in mice and shown to promote tumor growth rate and metastasis, as well as cancer cells-platelet co-cultures, also found to increase metastatic ability upon transplantation in mice in a TGF$\beta$1-dependent fashion. The interaction between CTCs and platelets has been postulated also in patient samples in various other studies, mostly by detecting the expression of platelet markers (e.g., ITGA2B, ITGB3, SELP, SPARC) from total RNA extracts of CTCs (both single and clustered). Together, the data on heterotypic interactions of CTCs with immune and non-immune stromal cells provides evidence for multiple types of possible interactions, many of which result in CTCs "bringing their own soil" and increasing their likelihood to efficiently metastasize. While this field of research is still at an early stage and the literature is not extensive, future work will be key to classify the frequency and composition of heterotypic CTC clusters in various cancer types and along disease progression, together with a broader understanding of their implications for the metastatic process.

6.13. Circulating Tumor Cell-Neutrophil Clusters

It is likely homotypic CTC clusters play a lesser role in metastatic disease than do heterotypic CTC clusters. Patients in whom at least one CTC-neutrophil cluster was detected in 7.5 ml of peripheral blood were characterized by a significantly worse progression-free survival compared to patients with five or more CTCs per 7.5 ml of peripheral blood (previously defined as a threshold for adverse outcome), as well as when compared to all patients with no CTC-neutrophil clusters, patients with at least one CTC per 7.5 ml of blood or patients in whom either single CTCs or CTC clusters were found.

Mice injected with CTCs from CTC-neutrophil clusters develop overt metastasis faster than those injected with CTCs alone and, accordingly, survive for a shorter time. Thus, CTC-neutrophil clusters represent the most efficient metastasis-forming cell subpopulation among breast CTCs, and their presence in the bloodstream of patients is associated with a poor prognosis.

6.14. Substances that Disrupt Cell Adhesion

Any substance that disrupts, dissolves, dissociates, or denatures intercellular adhesion molecules can be used according to the subject technology, provided it can be used in a safe manner at a suitable dose. Such substances include, but are not limited to, proteases, such as serine proteases including urokinase-type plasminogen activator (uPA) (or simply "urokinase") and tissue plasminogen activator (tPA), and nonprotease plasminogen activators such as streptokinase.

Disaggregation of CTC clusters has also been reported with genetic knockdown of plakoglobin, which leads to compromised metastatic efficiency in the animal models.

6.14.1. Urokinase

Once in circulation, CTC clusters have slower flow rate than single CTCs within blood vessels, which suggests its embolus/thrombus-like behavior. Administration of a thrombolytic agent called urokinase-type plasminogen activator (uPA) is effective at breaking down CTC clusters into single cells as well as modestly reducing numbers of metastatic lesions and improving survival. uPA expression is also associated with enhanced tumor migration and invasion and higher rates of tumor progression and metastasis, suggesting a differential role of uPA in early versus metastatic stage.

6.14.2. Streptokinase

During thrombolytic therapy with streptokinase (SK), plasma concentrations of four out of six adhesion molecules [soluble L-selectin, P-selectin, E-selectin, intercellular adhesion molecule-1 (ICAM-1), vascular cell adhesion molecule-1 (VCAM-1) and platelet endothelial cell adhesion molecule-1 (PECAM-1)] at 3 hours after intervention.

In one study, while soluble E-selectin and PECAM-1 concentrations did not differ within the 3 hours after SK administration, the level of P-selectin, L-selectin, ICAM-1, VCAM-1 were significantly reduced after thrombolysis with SK.

Thus, adhesion molecules mediating interactions in leukocyte endothelium vary in levels after reperfusion with SK. SK can be used according to principles of the subject technology to break up adhesion between cells in circulating clusters.

6.15. Filtering Device

When circulating cell clusters are minimized or eradicated from the bloodstream, the goal is for the disease to become more amenable to both systemic (e.g., chemotherapy) and local therapies, such as radiation and ablation techniques.

An intra- or extracorporeal device may be connected to a subject's blood circulation, such as by a cannula or catheter inserted into a blood vessel, e.g., artery, vein, or arteriovenous fistula, in a way like that done for dialysis or apheresis. An intracorporeal device could reside in the inferior or superior vena cava, for example, as how a thrombosis filter (e.g., Greenfield filter) would. Some or all blood flow from the blood vessel may be directed into the device, to have cell clusters temporarily trapped or slowed in their flow, to permit the clusters to contact a substance (a "cell-separating agent") that separates cells in the cluster, as by dissolution or digestion of molecules adhering the cells together. This could be done, for example, with a protease, such as trypsin, chymotrypsin, urokinase, or tissue plasminogen activator (TPA), among other enzymes, or streptokinase, a non-enzymatic agent.

Blood from a subject, typically a mammal such as a human, enters the chamber via an inlet channel or port and, after being filtered, exits from the chamber via an outlet channel or port and returns to the subject's circulation. Circulating cell clusters, once broken apart by a cell-separating agent, can also be returned to circulation as individual cells or smaller cell clusters.

Various pore sizes may be used for the different types of clusters, with even the smallest pore size typically being larger than white blood cells (WBCs) (e.g., neutrophils). This can ensure that WBCs, red blood cells (RBCs,) and platelets will filter through, allowing them to return to circulation.

In an embodiment, a subject's blood is drawn from and returned to the venous system through a standard dual-lumen catheter or access port or a double needle system. A peristaltic pump can maintain a desired flow condition. The pump can be controlled to provide either constant flow or to maintain a desired pressure. The pump is typically located before the cross flow filter module (pushing blood through).

Microsieve filters with 5 µm pores and an effective area of 2 cm$^2$ have been shown to trap individual circulating tumor cells and leukocytes. In some embodiments, a larger pore size is used to trap circulating cell clusters of three or more cells, e.g., 15 µm or larger.

In some embodiments a pore size of 20 µm, 25 µm, 30 µm, 35 µm, 40 µm, 50 µm, 60 µm, or larger is used to trap larger circulating clusters of two, three, or more cells.

Typically, 20-micron pores should trap nearly all clusters of 3 or more cells. And 30-micron pores should trap some or most clusters of 4 or more cells.

Properly designed microfilters can capture MCF-7 breast cancer cells at rate of 98±2% if they consist of uniform patterned distributions, ≥160,000 pores, and 7 µm pore diameters. Pore size around 8 µm in diameter has been shown to be optimal for single CTC retention. For cell clusters, pore size greater than 15 µm is generally desirable. For capturing larger clusters, pore sizes greater than 20 µm, 30 µm, 40 µm, 50 µm, or greater can be used according to the subject technology and can be customized by those skilled in the art according to the cells and cluster sizes sought to be filtered and/or treated.

Different combinations of pore sizes during a single application, as well as utilizing different pore sizes during each subsequent application, can be utilized to yield further information regarding the best techniques for minimizing circulating clusters and maximizing clinical response. This technique can be used repeatedly as necessary. Using the technique of isolating cell-free tumor DNA, one can ascertain whether in fact, this filtration procedure also reduces the cell-free tumor DNA component.

Figure 3:
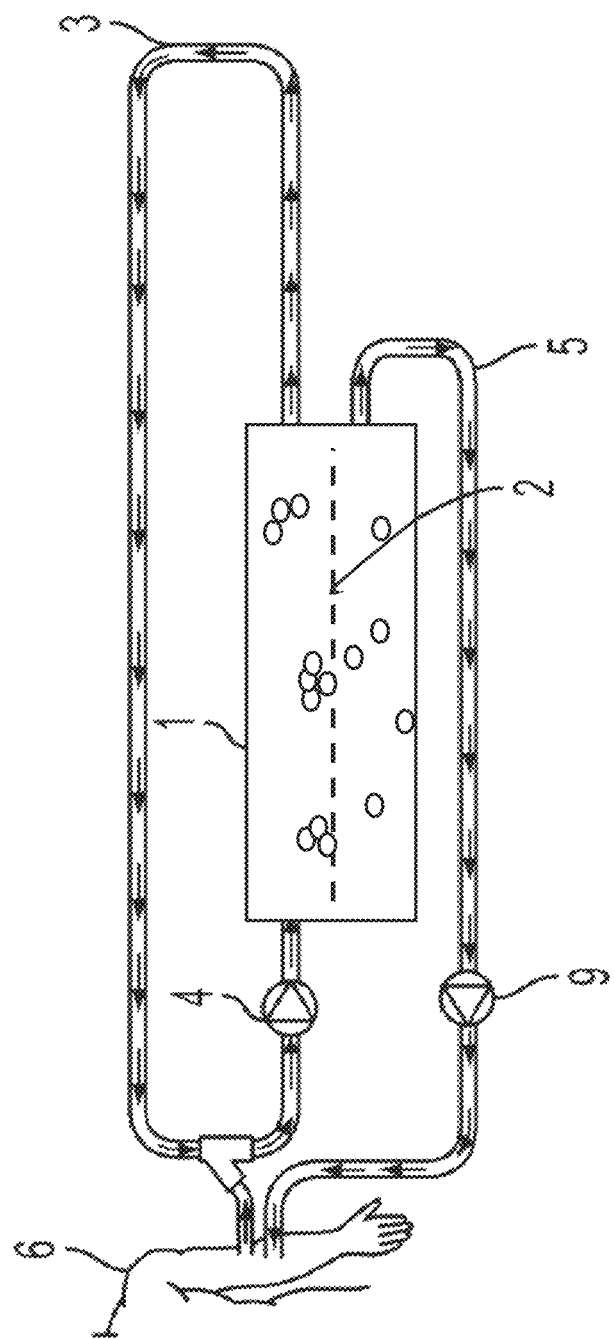
FIG. 3 shows an extracorporeal CTC cross-flow filtration device, according to one or more embodiments, including permeate and retentate fluid lines in which a retentate flow is recirculated.

FIG. 3 shows an extracorporeal CTC cross-flow filtration device, according to one or more embodiments, including permeate and retentate fluid lines in which a retentate flow is recirculated. Permeate fluid lines refer to the lines carrying fluid that has passed through a cross-flow filter, while retentate fluid lines refer to the lines recirculating the fluid that has not passed through the filter. The retentate fluid lines can be used to form a circuit that brings the unfiltered bodily fluid from the patient 6 to a cross-flow module 1. The cross-flow module 1 can trap cell clusters of three or more cells, for example, and permit individual CTCs and white blood cells (WBCs) to flow freely across the filter membrane from the fluid, and the bodily fluid containing the CTCs and WBCs can then be recirculated back to the patient 6 via permeate fluid line 5. The permeate fluid lines can form a circuit that takes the filtered bodily fluid that passes through the cross-flow filter 2 in the cross-flow module 1 and returns the fluid to the patient 6.

In various embodiments, the extracorporeal filtration device can comprise a cross-flow filter module 1 having inlet and outlet ends and a CTC cross-flow filter 2. The device can further comprise retentate fluid lines 3 for recirculating fluid that does not pass through the CTC cross-flow filter 2. The retentate fluid lines 3 can connect the retentate outlet of the filter module 1 with the retentate inlet of the filter module 1. The device can further comprise a recirculation pump 4, and a permeate fluid line 5 for returning fluid that has passed through the CTC cross-flow filter 2 back to the patient 6, e.g., via a vascular access and pump 9.

The flow rate of the permeate fluid, as it is returned to the patient 6 in steady state, can be set with aid of the permeate pump 9 to the same rate as the vascular access flow rate drawn from the patient (e.g., 100 ml/min). To set the flow rate of the recirculating retentate fluid at a relatively low value may provide a number of advantages, including that the CTCs and WBCs will have a longer interaction time to recognize each other, and it will be easier to separate the CTCs from the WBCs in an optional second filtering step using, e.g., a second filter in a treatment chamber. In certain embodiments, the flux of permeate fluid passing through the cross-flow filter 2 is between about 0.2 ml/cm$^2$/min and 20 ml/cm$^2$/min (e.g., about 0.2 ml/cm$^2$/min, 0.5 ml/cm$^2$/min, 1.0 ml/cm$^2$/min, 2.0 ml/cm$^2$/min, 5.0 ml/cm$^2$/min 10.0 ml/cm$^2$/min, or 20 ml/cm$^2$/min, or any value in between).

In some embodiments, the retentate fluid lines 3 can comprise a retentate processor or treatment chamber that is able to separate CTCs from WBCs. This chamber can preferentially bind or retain CTCs with respect to other blood or other cells present in the retentate fluid lines 3. In some embodiments, the treatment chamber retains CTCs using a filter that uses size-based filtration to retain CTCs, while allowing passage of other cells in the bodily fluid. In some embodiments, the treatment chamber retains CTCs using one or more (e.g., one, two, three, four, five or more) different types of antibodies that are specific for CTCs. For example, some CTCs are of epithelial origin and express EPCAM. Accordingly, in some embodiments, the treatment chamber can bind CTCs via an anti-EPCAM antibody, anti-EFGR antibody, or other antibody-CTC interaction mechanism.

In some embodiments, the antibodies are bound to a blood compatible hydrogel layer composed of polymer chains, with a length typically between 500 nm and 5 µm, capable in binding a large number of antibodies per polymer chain. The coating can provide a three-dimensional surface structure in which the chains of the hydrophilic polymer are aligned at least partly vertical to the substrate surface, e.g., brush-like. Due to their increased surface compared to planar structures, such brush-like hydrogel surfaces show a particularly enhanced immobilization capacity for biomolecules, such as antibodies and other affinity molecules which are capable of binding the target cells. It has been found that brush-like structured hydrogel coatings, in particular those which comprise or consist of certain polycarboxylate polymers, provide an excellent surface for selectively attaching cells to a solid support for subsequent detection and/or quantification.

The CTC cross-flow filter 2 can have, for example, round pores with a diameter between about 15 µm and about 60 µm (e.g., about 15 µm, 20 µm, 25 µm, 30 µm, 40 µm, or 50 µm, or any size in between), or slit-shaped pores with a width between about 15 µm and 60 µm (e.g., about 15 µm, 20 µm, 25 µm, 30 µm, 40 µm, or 50 µm, or any size in between), a length between 15 µm and 60 µm. The specific shape and dimensions of the pores can be chosen for substantially complete permeation of red blood cells (RBCs), platelets, individual CTCs, and WBCs. Repetitive recirculation of the retentate over the cross-flow filter 2 can concentrate the retentate with increasing quantities of CTC clusters. Concentration methods encompass any method that results in a fluid or fluid sample having an increased concentration of CTCs after application of the method, as compared to the initial concentration prior to the method.

In certain embodiments, the cross-flow filter 2 is a microsieve. For example, the microsieve is a flat, rigid filter device manufactured by semiconductor fabrication technologies. In certain embodiments, the semiconductor fabrication can produce a filter having a large number of precise filter pores of arbitrary geometry and pattern by etching through very thin layers of, e.g., silicon nitride, applied to a monocrystalline silicon wafer. Such filters are described, for example, in U.S. Publication No. 2011/0244443, published Oct. 6, 2011 and entitled "Methods, Systems and Devices for Separating Tumor Cells," which is hereby incorporated by reference herein in its entirety. Other filter materials can also be used, such as polymeric materials, silicon, silicon nitride, silicon oxide, diamond-like carbon, or any other suitable material having sufficient structural strength to support a thin surface having a high percentage porosity and capable of remaining intact when exposed to a bodily fluid under pressure.

In certain embodiments, the filter 2 has a smooth flat polished surface with regularly spaced straight pores with an aspect ratio (ratio of the axial length to diameter) of no more than ten, or of no more than two.

6.15.1. Drug Elution

Controlled drug delivery of the cell-separating agent can be accomplished using coatings on a surface of the blood filter of the subject technology, as is used, for example, in drug-eluting stents (DES) and drug-eluting balloons (DEB). These can use, for instance, polymeric biodegradable, non-thrombogenic materials to release the active substance. Such materials can include, for example, degradable carbohydrates and/or hydrogels, cellulose, nanocellulose, poly(lactic-co-glycolic acid) (PLGA), poly(caprolactone) (PCL), poly(hydroxybutyrate valerate), polyorthoester, poly(ethylene oxide)/poly(butylene terephthalate), polyurethane, silicone, and poly(ethylene terephthalate), SIBS polymer, or nanocomposite polymer polyhedral oligomeric silsesquioxane poly(carbonate urea) (POSS-PCU). A sustained release of the agent from a reservoir-based system or matrix-type delivery system can be used, with the agent being uniformly or nonuniformly distributed, for example, as a solid into a hydrogel matrix. Other types of materials and methods for sustained drug delivery as known to the skilled artisan can be used according to the subject technology.

6.15.1.1 Drug Elution Device Example

In an exemplary embodiment of the subject technology, shown in FIG. 1A, urokinase (uPA) (or other appropriate cell-separation agent) is embedded under a surface, or in a coating, of a blood filter or chamber wall, for example, to deliver an amount of the enzyme from by any of various drug elution techniques, such as by using a matrix- or reservoir-based hydrogel system with cellulose or other appropriate polymer or base material, to deliver a specified dose over the expected time period of one blood filtering session.

Blood from a subject, typically a mammal such as a human, enters the chamber via the inlet channel and, after being filtered, exits from the chamber via the outlet channel. Circulating cell clusters, once broken apart by a cell-separating agent, are returned to circulation as individual cells or smaller cell clusters in this example.

The total dose of uPA to be delivered over one blood filtering session, e.g., 2-3 hours, could be similar to that recommended for delivery intravenously for pulmonary embolism (PE):

For example, PE infusion of uPA is typically about 4400 international units/kg IV at a rate of 90 mL/hr over 10 minutes, then a maintenance dose of 4400 international units/kg/hr IV at a rate of 15 mL for 12 hours=8800 units/kg bodyweight over 12 hours. If a blood filtering session lasts about three hours, the dose could be approximately one-fourth of the 12-hour infusion dose, or about 2200 IU/kg eluted from the filter or chamber wall surface during the session.

Figure 2:
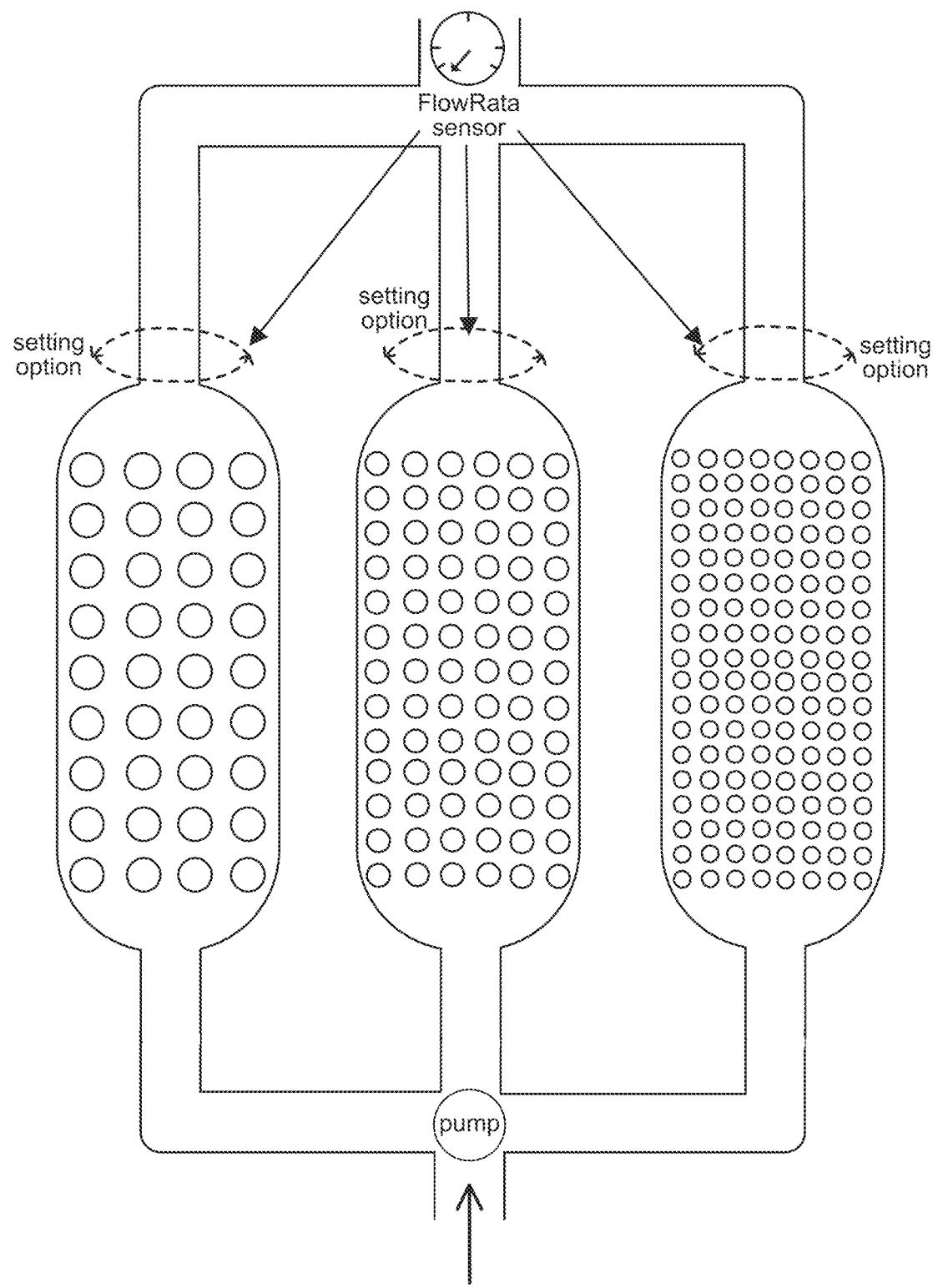
FIG. 2 is a schematic of a filter system with three chambers in parallel.

An alternative embodiment of the device is shown in FIG. 2, in which a parallel, multi-chamber system permits cell clusters to be filtered in more than one chamber at a time; three chambers are illustrated in this example. Different pore sizes can be used in different chambers, and the pore sizes can be adjustable to filter successively smaller clusters during a treatment session. The pores in FIG. 2 are configured as spaces between pillars, and in some embodiments, the pillars can be rotated to alter the pore spacing, i.e., the interpillar distances.

6.15.1.2 Drug Elution Device for Trapping Circulating Cancer-Associated Clusters In an exemplary embodiment of the subject technology, shown in FIG. 1A, for delivering a specified dose over the expected time period of one blood filtering session.

Blood from a subject, typically a mammal such as a human, enters the chamber via the inlet channel (input port) and, after being filtered, exits from the chamber via the outlet channel (output port). Circulating cell clusters are not broken apart by a cell-separating agent but are halted or trapped on or near a surface, near a pore, of the blood filter. In some embodiments, the pores have an average size of at least 10 microns, at least 15 microns, at least 20 microns, at least 25 microns, at least 30 microns, at least 35 microns, at least 40 microns, at least 45 microns, at least 50 microns, at least 55 microns, at least 60 microns, at least 65 microns, at least 70 microns, at least 75 microns, at least 80 microns, at least 85 microns, at least 90 microns, at least 95 microns, at least 100 microns, or more. In some embodiments, the pores have an average size of between about 10 microns to about 100 microns, between about 20 microns to about 60 microns, between about 15 microns to about 35 microns, or between about 25 to about 50 microns.

In some embodiments, whole blood can enter the inlet (or input port) to be filtered for removal of cancer-associated clusters. This blood is then returned to the subject after filtration via the outlet (or output port), while appropriately sized cancer-associated cell clusters remain trapped in the filter.

In other embodiments, red blood cells (RBCs) may first be separated from other blood components using a plasma separator or apheresis device, to permit plasma and other cells besides RBCs (including leukocytes and cancer-associated cells) to enter the filter. In this case, both the RBCs and filtered blood cells and plasma are returned to the subject after filtration, while appropriately sized cancer-associated cell clusters remain trapped in the filter.

In some embodiments, the blood comprises an anticoagulant to prevent clogging. Non-limiting example of anticoagulants are heparins, citrates, warfarin, and Factor Xa inhibitors.

6.15.1.3 Drug Infusion Device Example

Figure 1B:
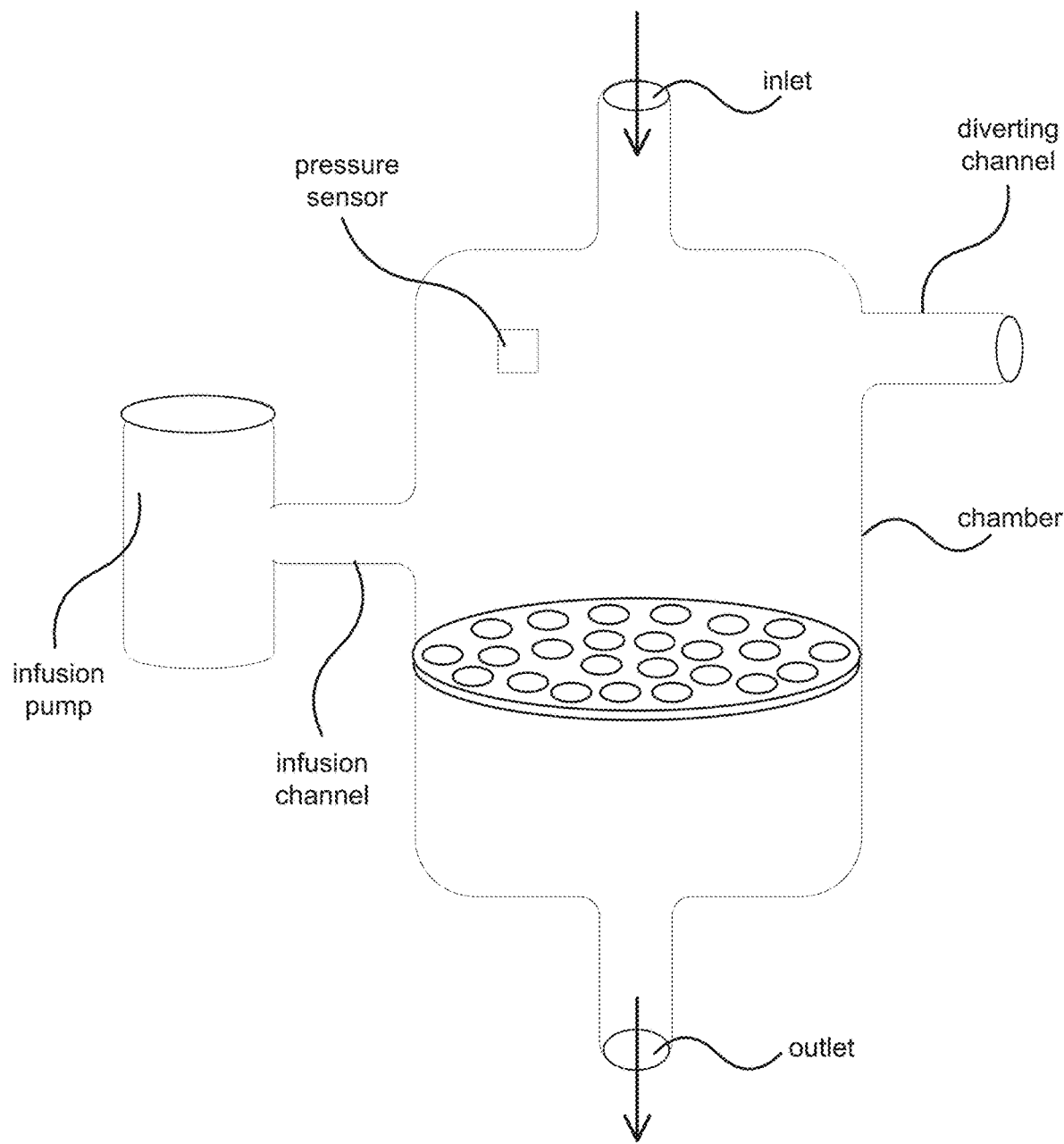

In some embodiments of the subject technology, illustrated in FIG. 1B, cell clusters can become temporarily halted or trapped on or near a surface, near a pore, of the blood filter. At some time after beginning the blood filtration procedure, the substance (cell-separating agent) can be introduced into the chamber either manually or automatically, for example, in the following manner.

When blood flow decreases as filter pores become progressively clogged, hydrostatic pressure increases in the chamber immediately upstream from the filter (the "prechamber"), and flow can be increasingly or abruptly diverted into another chamber via a diverting channel, causing initiation of a manual infusion or automatic infusion, e.g., via a pump, of the cell-separating agent into the prechamber, e.g., when the pressure rises above a first threshold. This infusion can be triggered by an electronic pressure sensor or similar sensor circuit. The infusion can continue at a specified rate until the full dose of the cell-separating agent has been delivered, or the infusion can cease when pressure in the prechamber decreases below a second threshold, such as when the pores are less clogged and flow increases through the pores, in which case the infusion can restart when the pressure rises again, e.g., past the first pressure threshold.

As in the drug-eluting device example above, blood from a subject, typically a mammal such as a human, enters the chamber via the inlet channel and, after being filtered, exits from the chamber via the outlet channel. Circulating cell clusters, once broken apart by a cell-separating agent, are returned to circulation as individual cells or smaller cell clusters in this example.

The foregoing description is provided to enable a person skilled in the art to practice the various configurations described herein. While the subject technology has been particularly described with reference to the various figures and configurations, it should be understood these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

7. EXEMPLARY EMBODIMENTS

Embodiment 1. A method for disaggregating a cluster of two or more cells in blood of a subject, comprising: directing blood of a subject into chamber comprising a filter, the blood comprising a cluster of two or more cells; after the cluster contacts a surface of the filter, contacting the cluster with a substance such that the two or more cells separate from each other; and permitting the two or more separated cells to flow from the chamber into a bloodstream of the subject.

Embodiment 2. A device for disaggregating a cluster of two or more cells in blood of a subject, comprising: a chamber into which blood from a subject can flow; wherein the chamber comprises a filter, the filter having pores sized to permit blood to flow, and prevent a cluster of two or more cells from passing, through the pores; a substance that separates the two or more cells from each other after the substance contacts the cluster; wherein the device is configured to permit the two or more separated cells to flow from the chamber into a bloodstream of the subject.

Embodiment 3. A device for disaggregating a cluster of two or more cells in blood of a subject, comprising: a chamber into which blood from a subject can flow; wherein the chamber comprises a filter, the filter having pores sized to permit blood to flow, and prevent a cluster of two or more cells from passing, through the pores; a substance that separates the two or more cells from each other after the substance contacts the cluster; wherein the device is configured to permit the two or more separated cells to flow from the chamber into a bloodstream of the subject.

Embodiment 4. The method or device of any of Embodiments 1-3, wherein the substance elutes from a surface of the chamber.

Embodiment 5. The method or device of any of Embodiments 1-3, further comprising an infusion port configured to introduce the substance into the chamber after a hydrostatic pressure in the chamber rises above a threshold.

Embodiment 6. The method or device of any of Embodiments 1-3, further comprising introducing the substance into the chamber after a hydrostatic pressure in the chamber rises above a threshold.

Embodiment 7. The method or device of any of Embodiments 1-3, wherein the substance comprises a protease.

Embodiment 8. The method or device of any of Embodiments 1-3, wherein the substance comprises a urokinase plasminogen activator.

Embodiment 9. The method or device of any of Embodiments 1-3, wherein the substance comprises a streptokinase.

Embodiment 10, A system for removing cancer-associated cell clusters from a blood circulation of a subject, comprising: a filter having and input port, an output port, and a membrane having pores that permit at least a portion of a subject's blood to pass through the pores from a first side to a second side of the membrane; wherein the pores are sized and configured such that, after at least a portion of a subject's blood flows into the filter through the input port, the pores permit circulating cancer cells and leukocytes to pass freely through the pores from the first side to the second side of the membrane and then to pass from the second side of the membrane through the output port to return to the subject's blood circulation; wherein the pores are further sized and configured to prevent circulating cell clusters from passing through the pores, each of the circulating cell clusters comprising three or more cells; and wherein, when the filter is in use, at least a portion of the subject's blood flows from a blood vessel of the subject into the filter, and then individual circulating cancer cells of the subject pass freely from the first side to the second side of the membrane, flow out of the filter, and return to the subject's blood circulation.

The system of the above Embodiment 10, wherein the pores have an average size of at least 20 microns, at least 25 microns, at least 30 microns, at least 40 microns, at least at least 50 microns, or at least 60 microns.

8. EXAMPLES

8.1. Example 1. Removal of Circulating Cancer-Associated Cell Clusters from a Subject This example illustrates a method using the system described herein for extracorporeal blood processing and removal of circulating cancer-associated cell clusters from a subject. The subject is diagnosed of a cancer or is at risk of suffering from a cancer. The subject can be receiving neo-adjuvant or adjuvant therapy.

The system is connected to the venous system of the subject through a standard dual-lumen catheter or access port or a double needle system. Blood is drawn to the system from the subject, either as whole blood or fractionated blood with red blood cells having been separated from plasma and other cells including leukocytes and cancer-associated cells and allowed to run through the filter module. Circulating cancer-associated cell clusters are trapped and captured on the surface of the membrane within the filter module, while individual cancer-associated cells and white blood cells are allowed to pass through freely and returned to the subject's blood circulation. Optionally, the blood is diverted to a recapturing circuit to capture any cancer-associated cell clusters to reduce the level of cancer-associated cell clusters returning to the subject's blood circulation.

The system effectively reduces circulating cancer-associated cell clusters in the subject's blood, reduces cancer metastasis and increases progress-free survival of the subject.

9. EQUIVALENTS AND INCORPORATION BY REFERENCE

While the invention has been particularly shown and described with reference to a preferred embodiment and various alternate embodiments, it will be understood by persons skilled in the relevant art that various changes in form and details can be made therein without departing from the spirit and scope of the invention.

All references, issued patents and patent applications cited within the body of the instant specification are hereby incorporated by reference in their entirety, for all purposes. In particular, U.S. Pat. Nos. 9,545,471 and 11,724,015, each of which is hereby incorporated by reference in its entirety.

What is claimed is:

1. A method of removing circulating cancer-associated cell clusters from a subject, the method comprising:
   connecting a portion of the subject's blood stream to a system thereby allowing the subject's blood to flow into the system:
      wherein the system comprises a filtering module comprising: (a) an input port, (b) an output port, and (c) a membrane having pores configured to allow at least a portion of a subject's blood to pass through the pores from a first side to a second side of the membrane;
      wherein the pores in the membrane have a minimum size not less than about 20 microns, configured to allow individual cancer-associated cells to pass through the pores from the first side to the second side of the membrane;

wherein the input port is configured to allow the subject's blood to flow into a first chamber to contact the membrane;

wherein the filtering module is configured to retain circulating cancer-associated cell clusters on the first side of the membrane, each cluster comprising three or more cells; and wherein the filtering module is configured to allow individual circulating cancer cells in the subject's blood to pass through the pores to the second side of the membrane and into a second chamber and return to the subject's blood circulation via the output port; and returning blood from the second chamber to the subject's blood circulation via the output port.

2. The method of claim 1, wherein the subject is a mammal.

3. The method of claim 1, wherein the subject is a human.

4. The method of claim 1, further comprising performing the method once or twice a week.

5. A method of removing circulating cancer-associated cell clusters from a subject, comprising:

introducing a portion of a subject's blood circulation into a filter comprising a membrane having pores that permit at least some of the subject's blood to pass through the pores from a first side to a second side of the membrane;

wherein the pores have a minimum size not less than about 20 microns and are sized and configured to permit individual cancer-associated cells to pass freely through the pores from the first side to the second side of the membrane;

wherein the pores are further sized and configured to prevent circulating cell clusters from passing through the pores, each of the circulating cell clusters comprising three or more cells; and returning blood from the second side of the membrane to the subject's blood circulation.

\* \* \* \* \*